United States Patent
Kitaji (10) Patent No.: US 9,253,685 B2
(45) Date of Patent: Feb. 2, 2016

(54) MOBILE COMMUNICATION SYSTEM, BASE STATION, AND COMMUNICATION METHOD

(75) Inventor: Mitsuhiro Kitaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 108 days.

(21) Appl. No.: 13/885,123

(22) PCT Filed: Nov. 15, 2011

(86) PCT No.: PCT/JP2011/076314
§ 371 (c)(1),
(2), (4) Date: May 13, 2013

(87) PCT Pub. No.: WO2012/067120
PCT Pub. Date: May 24, 2012

(65) Prior Publication Data
US 2013/0230014 A1    Sep. 5, 2013

(30) Foreign Application Priority Data
Nov. 18, 2010    (JP) .................. 2010-257702

(51) Int. Cl.
*H04W 28/08* (2009.01)
*H04W 72/04* (2009.01)
(52) U.S. Cl.
CPC .......... *H04W 28/08* (2013.01); *H04W 72/0426* (2013.01)
(58) Field of Classification Search
None
See application file for complete search history.

(56) References Cited

U.S. PATENT DOCUMENTS

| | | | |
|---|---|---|---|
| 2009/0131068 A1* | 5/2009 | Wu et al. | 455/452.2 |
| 2010/0173644 A1* | 7/2010 | Koyanagi | 455/453 |
| 2013/0039185 A1* | 2/2013 | Teyeb et al. | 370/235 |
| 2013/0045674 A1 | 2/2013 | Koyanagi | |

FOREIGN PATENT DOCUMENTS

WO    2009/050794 A1    4/2009

OTHER PUBLICATIONS

CMCC, 3GPP TSG-RAN WG3 Meeting #69 R3—10207; "An enhancement for MLB"; Aug. 23-27, 2010; Madrid, Spain; p. 1-3.*
An Office Action; "Notice of Reasons for Rejection," issued by the Japanese Patent Office on Apr. 22, 2014, which corresponds to Japanese Patent Application No. 2012-544265 and is related to U.S. Appl. No. 13/885,123; with English language statement of relevance.

(Continued)

*Primary Examiner* — Huy D Vu
*Assistant Examiner* — Hong Shao
(74) *Attorney, Agent, or Firm* — Studebaker & Brackett PC (57) ABSTRACT

A mobile communication system capable of communication control on the basis of load information transmitted/received between base stations by using inter-base-station communication, comprises: a base station eNB1; a base station eNB2 adjacent to the base station eNB1; and at least one base station eNB3 adjacent to the base station eNB2, wherein after receiving load information 3 of the base station eNB3 from the base station eNB3, the base station eNB2 transmits, to the base station eNB1, load information 2 of the base station eNB2 weighted by using the load information 3 of the base station eNB3.

5 Claims, 6 Drawing Sheets (56) References Cited

OTHER PUBLICATIONS

CMCC; 3GPP TSG-RAN WG3 Meeting #69bis meeting R3-102763; "Discussion on Further MLB Enhancement"; Oct. 11-15, 2010; Xi'an, China; retrieved on Dec. 1, 2011, retrieved from www.3gpp.org/ftp/tsg_ran/WG3_lu/TSGR3_69bis/Docs/R3-102763; pp. 1-2.
CMCC; 3GPP TSG-RAN WG3 Meeting #69 R3-102107; "An enhancement for MLB"; Sep. 23-27, 2010; Madrid, Spain; retrieved from www.3gpp.org/ftp/tsg_ran/WG3_lu/TSGR3_69/Docs/R3-102107; pp. 1-3.

3GPP TS 36.423 V9.4.0 (Sep. 2010); 3rd Generation Partnership Project; Technical Specification Group Radio Access Network; Evolved Universal Terrestrial Radio Access Network (E-UTRAN); X2 application protocol (X2AP) (Release 9); pp. 1-121.
3GPP TR 36.902 V9.2.0 (Jun. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).
International Search Report; PCT/JP2011/076314; Jan. 24, 2012.

* cited by examiner

MOBILE COMMUNICATION SYSTEM, BASE STATION, AND COMMUNICATION METHOD

TECHNICAL FIELD

The present invention relates to a mobile communication system, a base station, and a communication method, to which an SON technology is applied.

BACKGROUND ART

In LTE (Long Term Evolution) standardized in 3GPP (3rd Generation Partnership Project) which is a group aiming to standardize a mobile communication system, an SON (Self-Organizing Network) technology, in which a base station autonomously adjusts a parameter according to a base station without using any manpower, is applied (refer to Non Patent Literature 1).

As one of the SON technology, in order to balance loads between base stations, there has been proposed technique of adjusting a base station parameter (specifically, a handover parameter) for determining a coverage on the basis of load information transmitted/received between neighboring base stations. Such an optimization technology is called MLB (Mobility Load Balancing), and is able to improve service quality provided to a radio terminal. In addition, the coverage indicates the range of a logical or physical communication area of a base station.

Specifically, in LTE, the following four types of load information have been defined (refer to Non Patent Literature 2): (a) the number of used PRBs (Physical Resource Blocks) each of which is an assignment unit of a time and frequency resource, (b) a load of a backhaul between a base station and a core network, (c) a hardware load of a base station, and (d) a ratio of available communication capacity to a capacity class that is an index indicating relative communication capacity of a base station.

In the aforementioned MLB, for example, if a base station detects that a load of a neighboring base station is lower than that of the self base station on the basis of load information from the neighboring base station, the base station adjusts a parameter such that the coverage of the self base station is reduced with respect to the neighboring base station. In this way, it is possible to increase the load of the neighboring base station while reducing the load of the self base station, resulting in the balancing of the loads.

Furthermore, for example, if is the base station detects that the load of the neighboring base station is higher than that of the self base station on the basis of the load information from the neighboring base station, the base station adjusts a parameter such that the coverage of the self base station is expanded with respect to the neighboring base station. In this way, it is possible to reduce the load of the neighboring base station while increasing the load of the self base station, resulting in the balancing of the loads.

CITATION LIST

Non Patent Literature

Non Patent Literature 1: 3GPP TR36.902 "SON use cases and solutions"
Non Patent Literature 2: 3GPP TS36.423 "X2 application protocol (X2AP)"

SUMMARY OF THE INVENTION

The aforementioned MLB has the following problems.
Specifically, even in a case in which a load of a neighboring base station of a certain base station is low, when the number of radio terminals in a cell of a base station adjacent to the neighboring base station (hereinafter, appropriately a "next neighboring base station") is large, the radio terminals may move from the cell of the next neighboring base station to a cell of the neighboring base station. Therefore, the load of the neighboring base station may be increased in the future.

In such a situation, when the base station reduces the coverage on the grounds that the load of the neighboring base station is low, it is not possible to immediately absorb the load when the load of the neighboring base station increases. As a consequence, there is a problem that it is not possible to sufficiently improve service quality provided to a radio terminal.

Therefore, an object of the present invention is to provide a mobile communication system, a base station, and a communication method, by which it is possible to sufficiently improve service quality by performing communication control in consideration of a load of a next neighboring base station in addition to a load of a neighboring base station.

In order to solve the aforementioned problem, the present invention has a following characteristic. The characteristic of a mobile communication system according to the present invention is summarized as follows. The mobile communication system (mobile communication system 1) is capable of communication control on the basis of load information transmitted/received between base stations by using inter-base-station communication, comprising: a first base station (base station eNB1); a second base station (base station eNB2) adjacent to the first base station; and at least one third base station (base station eNB3) adjacent to the second base station, wherein after receiving load information of the third base station from the third base station, the second base station transmits, to the first base station, load information of the second base station weighted by using the load information of the third base station.

According to such a characteristic, after receiving the load information of the third base station from the third base station, the second base station transmits, to the first base station, load information of the self base station (the second base station) weighted by using the load information.

In this way, the first base station is able to perform communication control for the future in consideration of the state of the load of a next neighboring base station (the third base station), that is, a potential load of a neighboring base station (the second base station).

Consequently, according to the characteristic, MLB is achieved in consideration of the load of the next neighboring base station in addition to the neighboring base station, so that it is possible to provide a mobile communication system capable of sufficiently improving service quality.

Another characteristic of the mobile communication system according to the present invention is summarized as follows. In the mobile communication system, when transmitting the load information of the second base station weighted using the load information of the third base station to the first base station, the second base station transmits, to the first base station, information indicating that the load information of the second base station has been weighted.

Another characteristic of the mobile communication system according to the present invention is summarized as follows. In the mobile communication system, the first base station transmits a transmission request of the load information of the second base station to the second base station, the second base station transmits a transmission request of the load information of the third base station to the third base station in response to reception of the transmission request from the first base station, and the third base station transmits the load information of the third base station to the second base station in response to reception of the transmission request from the second base station.

Another characteristic of the mobile communication system according to the present invention is summarized as follows. In the mobile communication system, the first base station transmits a transmission request designating weighting or no weighting, the second base station transmits, to the first base station, the load information of the second base station weighted by using the load information of the third base station, when the transmission request from the first base station designates weighting, and transmits, to the first base station, load information of the second base station not weighted by using the load information of the third base station, when the transmission request from the first base station designates no weighting.

The characteristic of a mobile communication system according to the present invention is summarized as follows. The mobile communication system capable of communication control on the basis of load information transmitted/received between base stations, comprising: a first base station; a second base station adjacent to the first base station; and at least one third base station adjacent to the second base station, wherein after receiving load information of the third base station from the third base station, the second base station transmits load information of the second base station and the load information of the third base station to the first base station.

According to such a characteristic, after receiving the load information of the third base station from the third base station, the second base station transmits the load information of the second base station and the load information of the third base station to the first base station.

In this way, the first base station can perform communication control for the future in consideration of a load of a next neighboring base station (the third base station), that is, a possible load of a neighboring base station (the second base station).

Therefore, according to the characteristic above, it is possible to provide a mobile communication system which sufficiently improves service quality by achieving MLB in consideration of a load of a next neighboring base station in addition to a load of a neighboring base station.

Another characteristic of the mobile communication system according to the present invention is summarized as follows. In the mobile communication system, after receiving the load information of the second base station and the load information of the third base station from the second base station, the first base station weights the load information of the second base station using the load information of the third base station.

Another characteristic of the mobile communication system according to the present invention is summarized as follows. In the mobile communication system, the first base station transmits a transmission request designating the presence or absence of the load information of the third base station, the second base station transmits the load information of the second base station and the load information of the third base station to the first base station, when the transmission request from the first base station designates the presence of the load information of the third base station, and transmits the load information of the second base station to the first base station, when the transmission request from the first base station designates the absence of the load information of the third base station.

The characteristic of a base station according to the present invention is summarized as follows. The base station that operates as a second base station in a mobile communication system which includes a first base station, the second base station adjacent to the first base station, and at least one third base station adjacent to the second base station, and capable of communication control on the basis of load information transmitted/received between base stations, wherein after receiving load information of the third base station from the third base station, the base station transmits, to the first base station, load information of the base station weighted by using the load information of the third base station.

The characteristic of a base station according to the present invention is summarized as follows. The base station that operates as a second base station in a mobile communication system which includes a first base station, the second base station adjacent to the first base station, and at least one third base station adjacent to the second base station, and capable of communication control on the basis of load information transmitted/received between base stations, wherein after receiving load information of the third base station from the third base station, the base station transmits load information of the base station and the load information of the third base station to the first base station.

The characteristic of a communication method according to the present invention is summarized as follows. The communication method used in a mobile communication system which includes a first base station, a second base station adjacent to the first base station, and at least one third base station adjacent to the second base station and capable of communication control on the basis of load information transmitted/received between base stations, comprises: transmitting to the first base station, by the second base station, load information of the second base station weighted by using load information of the third base station after receiving the load information of the third base station from the third base station.

The characteristic of a communication method according to the present invention is summarized as follows. The communication method communication method used in a mobile communication system which includes a first base station, a second base station adjacent to the first base station, and at least one third base station adjacent to the second base station and capable of communication control on the basis of load information transmitted/received between base stations, comprises: transmitting, by the second base station, load information of the second base station and load information of the third base station to the first base station after receiving the load information of the third base station from the third base station.

The present invention can provide a mobile communication system, a base station, and a communication method, by which it is possible to sufficiently improve service quality by performing communication control in consideration of a load of a next neighboring base station in addition to a load of a neighboring base station.

DESCRIPTION OF THE EMBODIMENT

With reference to the drawings, the first embodiment, the second embodiment and other embodiments of the present invention will be described. In the drawings of each embodiment, the same or similar reference signs are applied to the same or similar parts.

In each embodiment as will be described below, the mobile communication system configured based on LTE (Long Term Evolution) standard, the specification of which is developed in 3GPP (3rd Generation Partnership Project). However, the present invention may be applied to the mobile communication system configured based on another standard.

(1) First Embodiment

A mobile communication system according to a first embodiment is a mobile communication system capable of performing communication control on the basis of load information transmitted/received between base stations using inter-base-station communication, and includes a first base station, a second base station adjacent to the first base station, and at least one third base station adjacent to the second base station. The second base station receives load information of the third base station from the third base station, and then transmits load information of the second base station weighted by using the load information of the third base station, to the first base station.

Hereinafter, the first embodiment will be described in the sequence of (1.1) Overview of mobile communication system, (1.2) Configuration of base station, (1.3) Operation of mobile communication system, and (1.4) Effect of the first embodiment.

(1.1) Overview of Mobile Communications System

Figure 1:
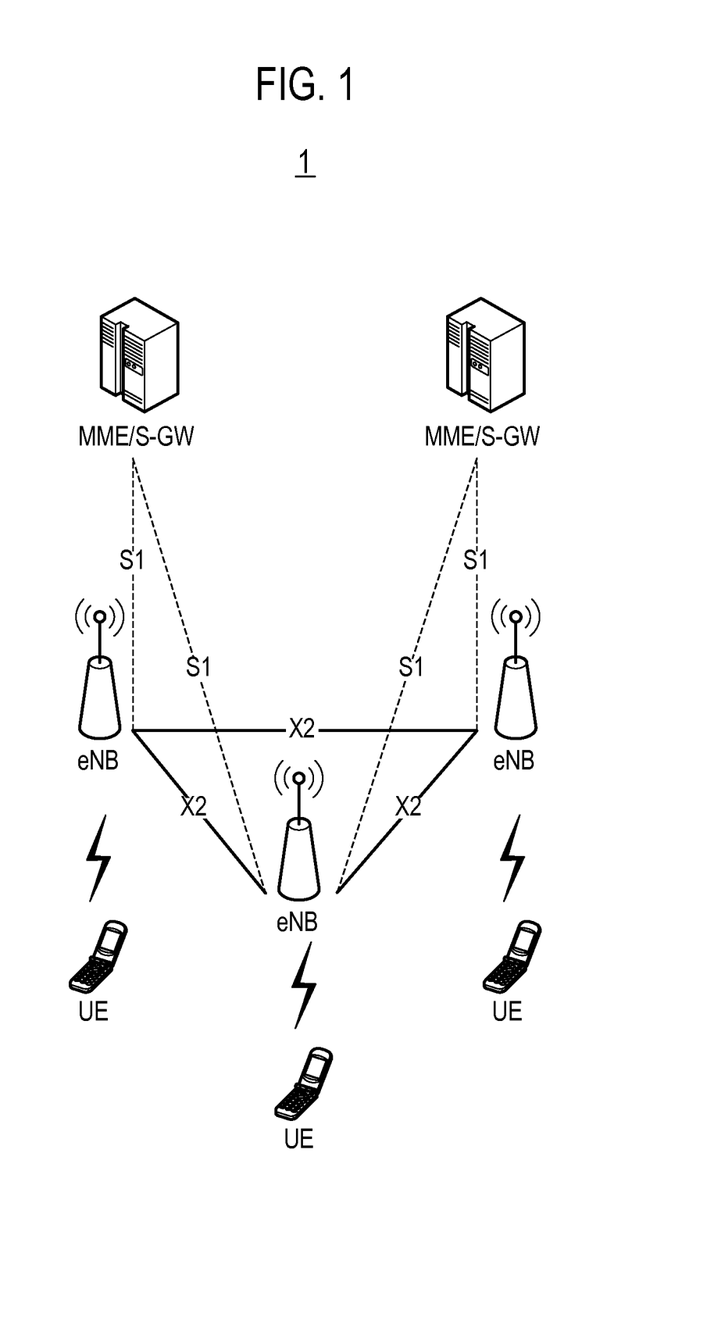
FIG. 1 is a network configuration diagram illustrating a network configuration of a mobile communication system according to the first embodiment and the second embodiment.

FIG. 1 is a network configuration diagram illustrating a network configuration of a mobile communication system 1 according to the first embodiment. The mobile communication system 1 employs an SON (Self Organizing Network) technology.

As illustrated in FIG. 1, the mobile communication system 1 includes a radio terminal UE (User Equipment), a plurality of base stations eNB (evolved Node-B), and a plurality of mobility management devices MME (Mobility Management Entity)/gateway devices S-GW (Serving Gateway).

The plurality of base stations eNB constitute E-UTRAN (Evolved-UMTS Terrestrial Radio Access Network). Each of the plurality of base stations eNB manages one cell or a plurality of cells serving as a communication area where a service should be provided to the radio terminal UE.

The base stations eNB adjacent to one another can communicate mutually via an X2 interface which is a logical communication channel to provide inter-base-station communication. Furthermore, each of the plurality of base stations eNB can communicate with EPC (Evolved Packet Core), specifically, the MME/S-GW, via an S1 interface.

The radio terminal UE is a radio communication device carried by a user, and is also called as "User Equipment". The radio terminal UE is able to perform switching of a serving base station (or a serving cell), that is, handover, during communication (referred to as a connected mode).

The radio terminal UE performs measurement for a reference signal received from the base station eNB, and transmits a report (a measurement report) regarding a measurement result to a serving base station eNB. The measurement result, for example, includes received power of the reference signal (RSRP). The measurement report may be transmitted from the radio terminal UE to the base station eNB, by using an event set by the base station eNB as a trigger, or may be periodically transmitted from the radio terminal UE to the base station eNB.

The base station eNB performs handover control on the basis of the measurement report received from the radio terminal UE. When the radio terminal UE receives reference signals from a plurality of base stations eNB, the measurement report may include a plurality of RSRPs corresponding to the plurality of base stations eNB. The base station eNB which received the measurement report determines a base station eNB with the highest RSRP of the plurality of base stations eNB as a handover destination, for example, on the basis of the measurement report.

The mobile communication system 1 supports the aforementioned MLB. The neighboring base stations eNB adjust a handover parameter as a base station parameter for determining a coverage on the basis of load information transmitted/received via the X2 interface. For example, when a load of one base station eNB is higher than that of a neighboring base station eNB, the handover parameter is adjusted, so that a coverage of the one base station eNB is reduced and a coverage of the neighboring base station eNB is expanded.

As such a handover parameter, it is possible to use an offset value for correcting RSRP measured by the radio terminal UE. For example, when one radio terminal UE is able to receive a radio signal from each of two base stations eNB, before RSRP1 corresponding to one base station eNB is compared with RSRP2 corresponding to the other base station eNB, an offset value for correcting the RSRP1 to be higher is added to the RSRP1. In this way, it is more likely that the RSRP1 after the offsetting exceeds the RSRP2. Thus, the one base station eNB is preferentially selected as a handover destination, and a coverage of the one base station eNB can be expanded. In addition, in order to avoid unnecessary handover, a pair of the base stations eNB takes one offset value, and the offset value is shared by the pair of the base stations eNB.

Figure 2:
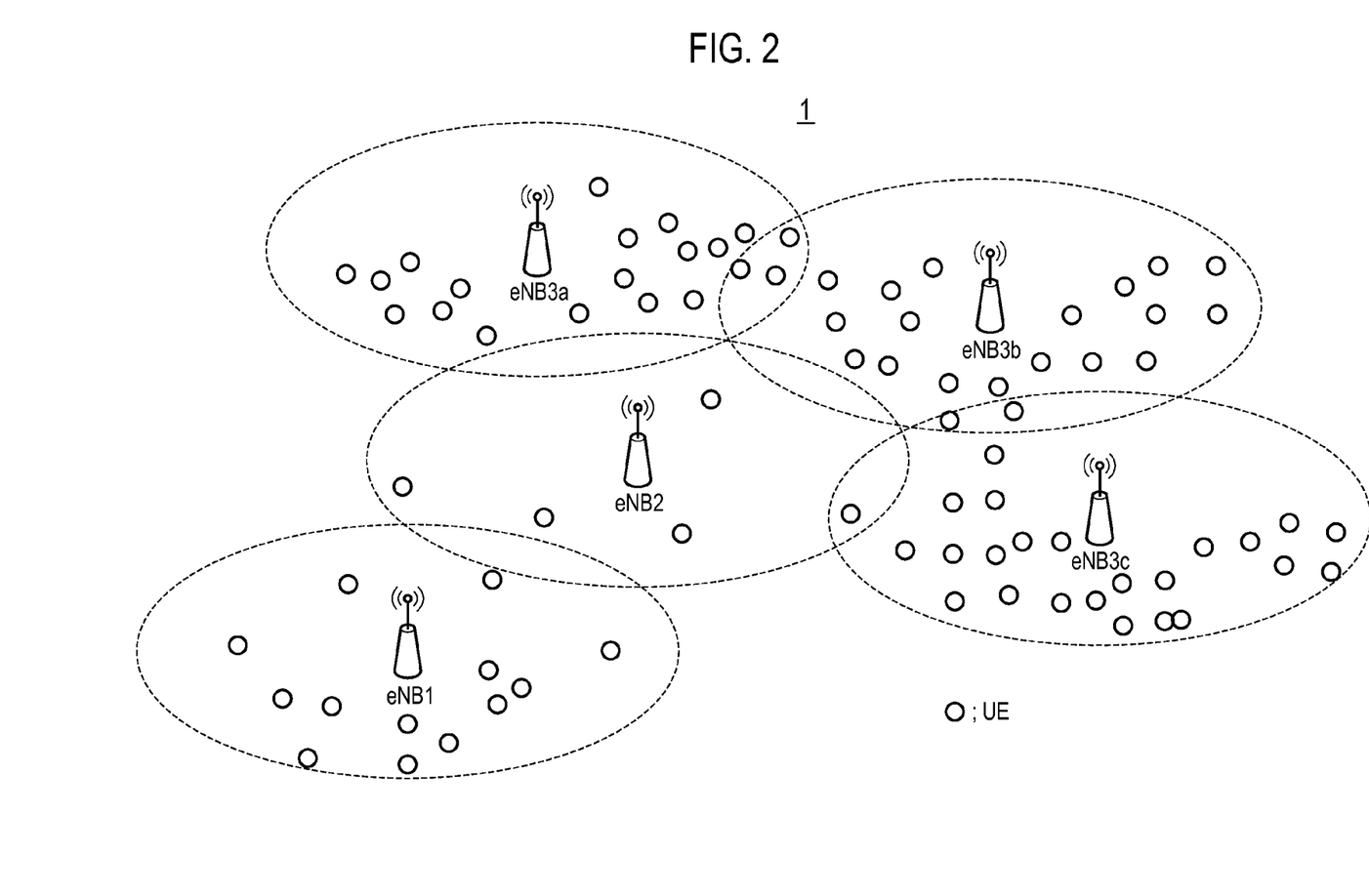
FIG. 2 is a diagram illustrating an example of a communication environment of the mobile communication system according to the first embodiment and the second embodiment.

FIG. 2 is a diagram illustrating an example of a communication environment of the mobile communication system 1. Circles in FIG. 2 indicate radio terminals UE performing communication.

As illustrated in FIG. 2, in the present communication environment, there are provided a base station eNB1, a base station eNB2 adjacent to the base station eNB1, and three base stations eNB3*a*, eNB3*b*, and eNB3*c* adjacent to the base station eNB2. The base station eNB1 corresponds to a first base station, the base station eNB2 corresponds to a second base station, and the base stations eNB3*a*, eNB3*b*, and eNB3*c* correspond to third base stations. Furthermore, in the present communication environment, the base stations eNB3*a*, eNB3*b*, and eNB3*c* are adjacent to the base station eNB2, and are not adjacent to the base station eNB2. That is, the base station eNB2 is a neighboring base station of the base station eNB1, and the base station eNB3 is a next neighboring base station of the base station eNB1. Hereinafter, when the base stations eNB3*a*, eNB3*b*, and eNB3*c* are not particularly distinguished to one another, the base stations eNB3a, eNB3b, and eNB3c are collectively referred simply to as the base station eNB3.

Each of the base station eNB1 and the base station eNB2 transmits/receives load information to/from each other, thereby adjusting the coverage of the self base station to balance loads. In the present communication environment, the number of radio terminals UE in a cell of the base station eNB1 is larger than that of radio terminals UE in a cell of the base station eNB2, and the load of the base station eNB1 is higher than that of the base station eNB2. Therefore, the base station eNB1 adjusts a handover parameter to reduce the coverage of the self base station on the basis of the load information of the base station eNB2.

However, there are a large number of radio terminals UE in cells of the base stations eNB3, and these radio terminals UE may move to the cell of the base station eNB2 and perform handover from the base station eNB3 to the base station eNB2. As a consequence, the load of the base station eNB2 is increased. However, there is a problem that the base station eNB1 adjusts the handover parameter to reduce the coverage, and therefore, it is not possible to immediately absorb the load.

In this regard, loads of the base stations eNB3 are reflected in the load information transmitted from the base station eNB2 to the base station eNB1, so that a potential load of the base station eNB2 is included in the load information, and thus such a problem is solved. Specifically, the base station eNB2 according to the first embodiment receives load information of the base stations eNB3 from the base stations eNB3, and transmits load information of the base station eNB2 weighted by using the load information of the base stations eNB3, to the base station eNB1.

(1.2) Configuration of Base Station

Next, the configuration of each of the base station eNB1 and the base station eNB2 according to the first embodiment will be described.

(1.2.1) Configuration of Base Station eNB1

Figure 3A:
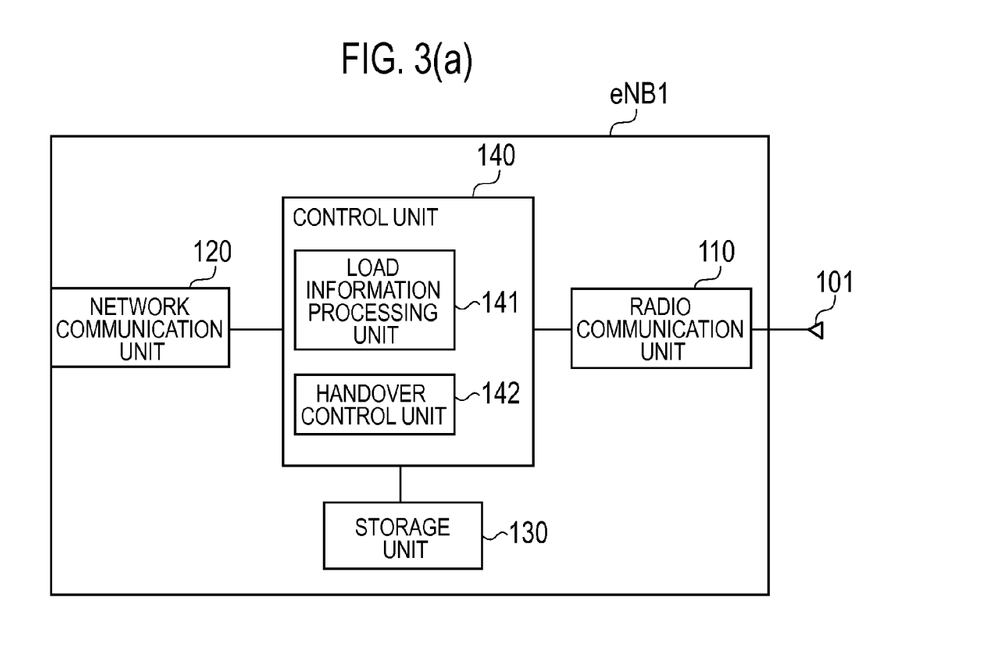
FIG. 3 is a block diagram illustrating the configuration of the base station according to the first embodiment and the second embodiment.

FIG. 3(a) is a block diagram illustrating the configuration of the base station eNB1 according to the first embodiment.

As illustrated in FIG. 3(a), the base station eNB1 includes an antenna 101, a radio communication unit 110, a network communication unit 120, a storage unit 130, and a control unit 140. The antenna 101 is connected to the radio communication unit 110. The radio communication unit 110, the network communication unit 120, and the storage unit 130 are connected to the control unit 140.

The antenna 101 is used for transmitting and receiving a radio signal. The antenna 101 may be configured using a plurality of antenna elements.

The radio communication unit 110, for example, is configured using a radio frequency (RF) circuit or a baseband (BB) circuit, and is configured to perform radio communication through the antenna 101. For transmission, the radio communication unit 110 performs coding and modulation of a transmitted signal that is input from the control unit 140, performs up-converting and amplification for the coded and modulated signal, and then outputs the up-converted and amplified signal to the antenna 101. For reception, the radio communication unit 110 performs amplification and down-converting of a received signal that is input from the antenna 101, performs demodulation and decoding for the amplified and down-converted signal, and then outputs the demodulated and decoded signal to the control unit 140.

The radio communication unit 110 transmits a reference signal. Furthermore, the radio communication unit 110 receives a measurement report from the radio terminal UE.

Moreover, when it is determined to perform handover of the radio terminal UE on the base of the measurement report, the radio communication unit 110 transmits a handover command to the radio terminal UE.

The network communication unit 120 is connected to a backhaul network, and communicates with another network device through the backhaul network, specifically, the base station eNB2 or the EPC.

The network communication unit 120 transmits/receives load information to/from the base station eNB2 using the X2 interface. In LTE, the following four types of load information have been defined (refer to Non Patent Literature 2): (a) the number of used PRBs (Physical Resource Blocks) each of which is an assignment unit of a time and frequency resource, (b) a load of a backhaul between a base station and a core network, (c) a hardware load of a base station, and (d) a ratio of available communication capacity to a capacity class that is an index indicating relative communication capacity of a base station.

The storage unit 130, for example, is configured using a memory and stores various types of information used for control and the like of the base station eNB1. The control unit 140, for example, is configured using a CPU, and controls various functions of the base station eNB1.

The control unit 140 includes a load information processing unit 141 and a handover control unit 142. The function of each of the load information processing unit 141 and the handover control unit 142, for example, is performed when CPU serving as the control unit 140 executes a program stored in the storage unit 130.

The load information processing unit 141 performs various types of processing and control related to the load information. Specifically, the load information processing unit 141 performs the following processing and control.

The load information processing unit 141 measures the load of the base station eNB1 and compares the load of the base station eNB1 with a threshold value. The load information processing unit 141 performs a procedure for acquiring the load information of the base station eNB2 in response to a result of comparing the load of the base station eNB1 with the threshold value. The procedure includes: a step of controlling, by the load information processing unit 141, the network communication unit 120 to transmit, to the base station eNB2, a transmission request (referred to as a Resource Status Request message) for requesting to start to transmit the load information; a step of receiving, by the network communication unit 120, a response for the Resource Status Request message (referred to as a Resource Status Response message) from the base station eNB2; and a step of receiving, by the network communication unit 120, a message (referred to as a Resource Status Update message) including the load information from the base station eNB2.

Furthermore, when transmitting the Resource Status Request message to the base station eNB2, the load information processing unit 141 is able to transmit a Resource Status Request message which designates weighting or no weighting. Specifically, the load information processing unit 141 includes information for requesting weighting in the Resource Status Request message or information indicating no weighting in the Resource Status Request message, thereby designating weighting or no weighting.

When the network communication unit 120 receives the Resource Status Update message including the load information of the base station eNB2, the load information processing unit 141 notifies the handover control unit 142 of the load information of the base station eNB2. Furthermore, the load information processing unit 141 notifies the handover control unit 142 of the load information of the self base station (the base station eNB1). Hereinafter, the load information of the base station eNB1 will be referred to as load information 1 and the load information of the base station eNB2 will be referred to as load information 2.

The handover control unit 142 performs various types of processing and control related to handover. Specifically, the handover control unit 142 performs the following processing and control.

The handover control unit 142 compares a load indicated by the load information 1 with a load indicated by the load information 2, and adjusts a handover parameter to expand the coverage of the self base station when the load indicated by the load information 1 is lower than the load indicated by the load information 2. For example, the handover control unit 142 increases an offset value added to RSRP corresponding to the self base station, or decreases an offset value added to RSRP corresponding to the base station eNB2, thereby expanding the coverage of the self base station with respect to the base station eNB2. Meanwhile, when the load indicated by the load information 1 is higher than the load indicated by the load information 2, the handover control unit 142 adjusts the handover parameter to reduce the coverage of the self base station. For example, the handover control unit 142 decreases the offset value added to RSRP corresponding to the self base station, or increases the offset value added to RSRP corresponding to the neighboring base station, thereby logically reducing the coverage of the self base station.

Such a handover parameter is notified by the radio communication unit 110 to the radio terminal UE and is used when the radio terminal UE compares RSRPs with one another. Alternatively, the handover parameter may be used when the handover control unit 142 compares RSRPs with one another.

However, in order to adjust a handover parameter, it is necessary to obtain permission from the base station eNB2. Thus, when a message (referred to as a Mobility Change Request message) for notifying an adjusted handover parameter from the network communication unit 120 is transmitted to the base station eNB2 and the adjusted handover parameter is confirmed to be permitted, the handover control unit 142 adjusts the handover parameter.

(1.2.2) Configuration of Base Station eNB2

Figure 3B:
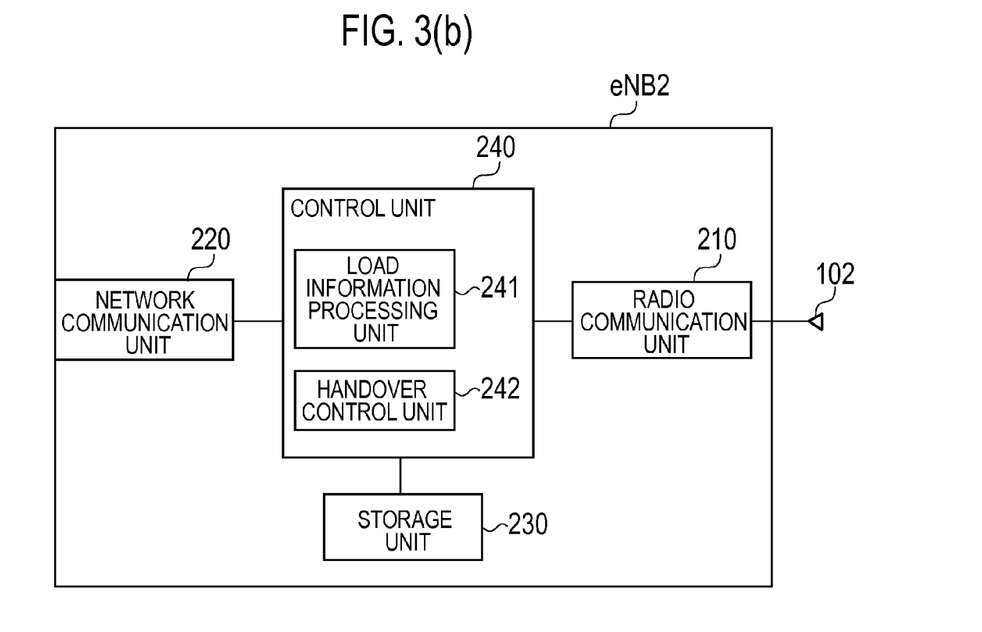

FIG. 3(b) is a block diagram illustrating the configuration of the base station eNB2 according to the first embodiment.

As illustrated in FIG. 3(b), the base station eNB2 includes an antenna 201, a radio communication unit 210, a network communication unit 220, a storage unit 230, and a control unit 240. The antenna 201 is connected to the radio communication unit 210, and the radio communication unit 210, the network communication unit 220, and the storage unit 230 are connected to the control unit 240.

The antenna 201 is used for transmitting and receiving a radio signal. The antenna 201 may be configured using a plurality of antenna elements.

The radio communication unit 210, for example, is configured using a radio frequency (RF) circuit or a baseband (BB) circuit, and is configured to perform radio communication through the antenna 201. For transmission, the radio communication unit 210 performs coding and modulation of a transmitted signal that is input from the control unit 240, performs up-converting and amplification for the coded and modulated signal, and then outputs the up-converted and amplified signal to the antenna 201. For reception, the radio communication unit 210 performs amplification and down-converting of a received signal that is input from the antenna 201, performs demodulation and decoding for the amplified and down-converted signal, and then outputs the demodulated and decoded signal to the control unit 240.

The radio communication unit 210 transmits a reference signal. Furthermore, the radio communication unit 210 receives a measurement report from the radio terminal UE. Moreover, when it is determined to perform handover of the radio terminal UE on the base of the measurement report, the radio communication unit 210 transmits a handover command to the radio terminal UE.

The network communication unit 220 is connected to a backhaul network, and communicates with another network device through the backhaul network, specifically, the base station eNB1 or the EPC. The network communication unit 220 transmits/receives load information to/from the base station eNB1 using the X2 interface.

The storage unit 230, for example, is configured using a memory and stores various types of information used for control and the like of the base station eNB2. The control unit 240, for example, is configured using a CPU, and controls various functions of the base station eNB2.

The control unit 240 includes a load information processing unit 241 and a handover control unit 242. The function of each of the load information processing unit 241 and the handover control unit 242, for example, is performed when CPU serving as the control unit 240 executes a program stored in the storage unit 230.

The load information processing unit 241 performs various types of processing and control involved in the load information. Specifically, the load information processing unit 241 performs the following processing and control.

When the network communication unit 220 receives the Resource Status Request message from the base station eNB1, the load information processing unit 241 performs a procedure for transmitting the load information 2 of the self base station (the base station eNB2), to the base station eNB1. The procedure includes: a step of controlling, by the load information processing unit 241, the network communication unit 220 to transmit a Resource Status Response message, which is a response for the Resource Status Request message, to the base station eNB1; a step of measuring, by the load information processing unit 241, the load of the self base station and generating the load information 2; and a step of controlling, by the load information processing unit 241, the network communication unit 220 to transmit a Resource Status Update message including the load information 2 to the base station eNB1.

When the network communication unit 220 receives the Resource Status Request message, which designates weighting, from the base station eNB1, the load information processing unit 241 controls the network communication unit 220 to transmit the Resource Status Request message to the base stations eNB3. Then, when the network communication unit 220 receives Resource Status Response messages from the base stations eNB3 and then receives Resource Status Update messages from the base stations eNB3, the load information processing unit 241 weights the load information 2 of the self base station, by using load information of the base stations eNB3 (hereinafter, referred to as load information 3), which is included in the Resource Status Update messages. The weighting, for example, indicates a process of adding a result, which is obtained by multiplying the load information 2 of the self base station by a predetermined coefficient, to a result obtained by multiplying the load information 3 of the base stations eNB3 by a predetermined coefficient. Alternatively, the weighting may indicate a process of calculating an average of the load information 2 of the self base station and the load information 3 of the base stations eNB3. The load information processing unit 241 controls the network communication unit 220 to transmit a Resource Status Update message including the weighted load information 2 to the base station eNB1. When transmitting the load information 2 of the base station eNB2 weighted by using the load information 3 of the base stations eNB3, to the base station eNB1, the load information processing unit 241 includes information indicating that the load information 2 of the base station eNB2 is weighted, in the Resource Status Update message.

Since the function of the handover control unit 242 is the same as that of the handover control unit 142 of the base station eNB1, a description of the handover control unit 242 will be omitted.

(1.3) Operation of Mobile Communication System

Next, an operation pattern 1 and an operation pattern 2 of the mobile communication system 1 according to the first embodiment will be described. The operation pattern 1 is an operation pattern of performing weighting of the load information 2 in the base station eNB2, and the operation pattern 2 is an operation pattern of not performing weighting of the load information 2 in the base station eNB2.

(1.3.1) Operation Pattern 1

Figure 4:
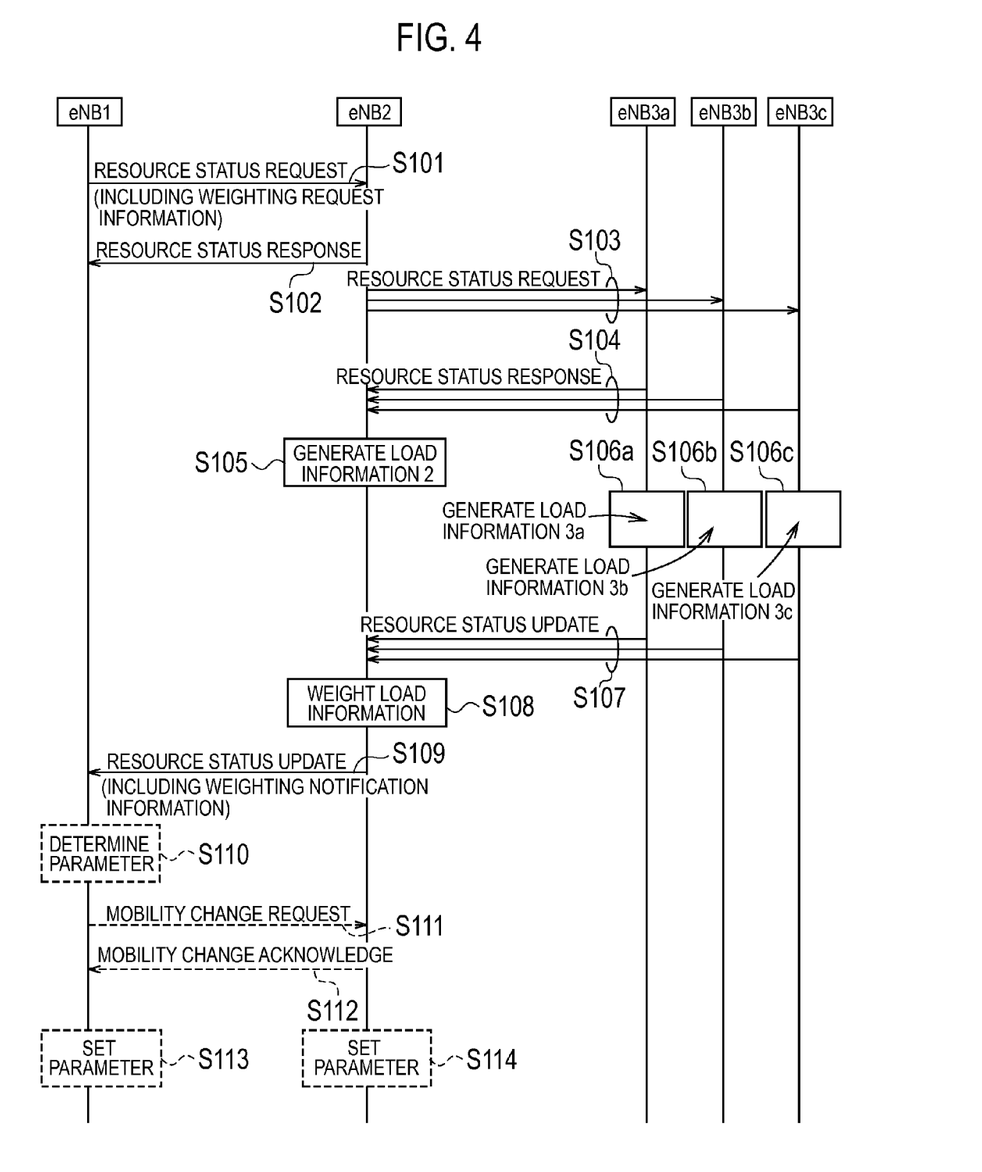
FIG. 4 is a sequence diagram illustrating the operation pattern of the mobile communication system according to the first embodiment.

FIG. 4 is a sequence diagram illustrating the operation pattern 1 of the mobile communication system 1 according to the first embodiment.

In step S101, the base station eNB1 transmits a Resource Status Request message including information for requesting weighting to the base station eNB2. The base station eNB2 receives the Resource Status Request message.

In step S102, the base station eNB2 transmits a Resource Status Response message to the base station eNB1 when permitting the Resource Status Request message from the base station eNB1. The base station eNB1 receives the Resource Status Response message.

In step S103, the base station eNB2 transmits the Resource Status Request message to the base stations eNB3 in response to the reception of the Resource Status Request message including information for requesting weighting from the base stations eNB1.

In step S104, the base stations eNB3 transmit a Resource Status Response message to the base station eNB2 when permitting the Resource Status Request message from the base station eNB2. The base station eNB2 receives the Resource Status Response message.

In step S105, the base station eNB2 measures a load of the self base station (the base station eNB2) according to the Resource Status Request message from the base station eNB1, and generates load information 2 indicating a measurement result. In addition, the process in step S105 may be performed before step S103 or between step S103 and step S104.

In step S106, the base stations eNB3 measure loads of their self base stations (the base stations eNB3) according to the Resource Status Request message from the base station eNB2, and generate load information 3 indicating a measurement result. Specifically, the base station eNB3a generates load information 3a, the base station eNB3b generates load information 3b, and the base station eNB3c generates load information 3c.

In step S107, the base stations eNB3 transmit a Resource Status Update message including the load information 3 to the base station eNB2. The base station eNB2 receives the Resource Status Update message.

In step S108, the base station eNB2 weights the load information 2, which was generated in step S105, using the load information 3 received in step S107. As described above, the weighting indicates a process of adding a result, which is obtained by multiplying the load information 2 by a predetermined coefficient, to a result obtained by multiplying the load information 3 by a predetermined coefficient. Alternatively, the weighting may indicate a process of calculating an average of the load information 2 and the load information 3.

In step S109, the base station eNB2 transmits, to the base station eNB1, a Resource Status Update message including the weighted load information 2 and information indicating that the load information 2 is weighted. The base station eNB1 receives the Resource Status Update message.

In step S110, the base station eNB1 determines a handover parameter between the self base station and the base station eNB2, by using the weighted load information 2 from the base station eNB2. For example, when the load information 1 indicating that the load of the base station eNB1 is equal to the weighted load information 2, the base station eNB1 considers the handover parameter to be optimized, and maintains the handover parameter without a change. Meanwhile, when the load information 1 is lower than the weighted load information 2, the base station eNB1 adjusts the handover parameter to expand the coverage of the self base station. Furthermore, when the load information 1 is higher than the weighted load information 2, the base station eNB1 adjusts the handover parameter to reduce the coverage of the self base station with respect to the base station eNB2. When the base station eNB1 adjusts a handover parameter of the self base station, the following processes are performed.

In step S111, the base station eNB1 transmits a Mobility Change Request message including the adjusted handover parameter to the base station eNB2. The base station eNB2 receives the Mobility Change Request message.

In step S112, the base station eNB2 transmits a Mobility Change Acknowledge message to the base station eNB1 when permitting the Mobility Change Request message. The base station eNB1, the base station eNB2, receives the Mobility Change Acknowledge message.

In step S113 and step S114, the base station eNB1 and the base station eNB2 set the adjusted handover parameter therein.

In addition, the processes of steps S105 to S109 are repeated until the base station eNB1 requests the base station eNB2 to stop the transmission of the load information.

(1.3.2) Operation Pattern 2

Figure 5:
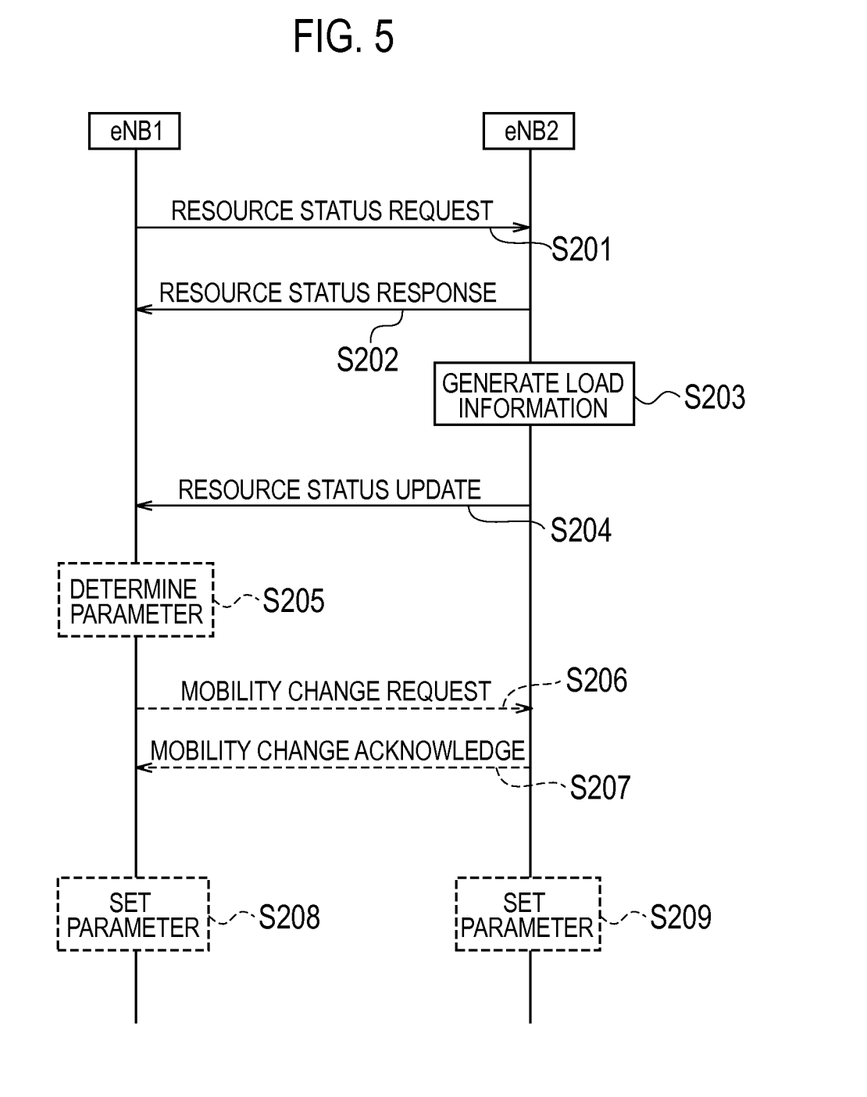
FIG. 5 is a sequence diagram illustrating the operation pattern 2 of the mobile communication system according to the first embodiment.

FIG. 5 is a sequence diagram illustrating the operation pattern 2 of the mobile communication system 1 according to the first embodiment.

In step S201, the base station eNB1 transmits, to the base station eNB2, a Resource Status Request message not including information for requesting weighting or a Resource Status Request message including information for not requesting weighting. The base station eNB1 receives the Resource Status Request message.

In step S202, the base station eNB2 transmits a Resource Status Response message to the base station eNB1 when permitting the Resource Status Request message from the base station eNB1. The base station eNB1 receives the Resource Status Response message.

In step S203, the base station eNB2 measures a load of the self base station (the base station eNB2) according to the Resource Status Request message from the base station eNB1, and generates load information 2 indicating a measurement result.

In step S204, the base station eNB2 transmits a Resource Status Update message including the load information 2 to the base station eNB1. The Resource Status Update message may include information indicating that the load information 2 is not weighted. The base station eNB1 receives the Resource Status Update message.

In step S205, the base station eNB1 determines the handover parameter of the self base station, by using the load information 2 from the base station eNB2. For example, when the load information 1 indicating that the load of the base station eNB1 is equal to the load information 2, the base station eNB1 considers the handover parameter to be optimized, and maintains the handover parameter without a change. Meanwhile, when the load information 1 is lower than the load information 2, the base station eNB1 adjusts the handover parameter to expand the coverage of the self base station. Furthermore, when the load information 1 is higher than the load information 2, the base station eNB1 adjusts the handover parameter to reduce the coverage of the self base station. When the base station eNB1 adjusts a handover parameter of the self base station, the following processes are performed. Since the following processes (steps S206 to s209) are equal to those of the operation pattern 1, a description thereof will be omitted.

(1.4) Effect of the First Embodiment

As described above, after receiving the load information 3 of the base stations eNB3 from the base stations eNB3, the base station eNB2 transmits load information 2 of the self base station weighted by using the load information 3, to the base station eNB1. In this way, the base station eNB1 is able to perform communication control for the future in consideration of the state of the loads of the base stations eNB3, which are next neighboring base stations, that is, a potential load of the base station eNB2 which is a neighboring base station.

Furthermore, in the first embodiment, when transmitting, to the base station eNB1, the load information 2 of the base station eNB2 weighted by using the load information 3 of the base stations eNB3, the base station eNB2 transmits, to the base station eNB1, information indicating that the load information 2 of the base station eNB2 is weighted. In this way, the base station eNB1 is able to recognize whether the load information 2 from the base station eNB2 is weighted, thereby performing appropriate communication control.

Moreover, in the first embodiment, in response to the reception of the Resource Status Request message from the base station eNB1, the base station eNB2 transmits the Resource Status Request message to the base stations eNB3. In response to the reception of the Resource Status Request message from the base station eNB2, the base stations eNB3 transmit the Resource Status Update message including the load information 3 of the base station eNB3, to the base station eNB2. In this way, it is possible to acquire the load information 3 only when the load information 3 is necessary, so that traffic of the backhaul is reduced as compared with the case in which each base station always transmits/receives load information.

In the first embodiment, when the Resource Status Request message from the base station eNB1 designates weighting, the base station eNB2 transmits the load information 2 of the base station eNB2 weighted by using the load information 3 of the base stations eNB3, to the base station eNB1. Meanwhile, when the Resource Status Request message from the base station eNB1 does not designate weighting, the base station eNB2 transmits the unweighted load information 2 of the base station eNB2, to the base station eNB1. In this way, the base station eNB1 is able to cope with both a situation for recognizing the state of the load of the base station eNB2 including a potential load and a situation for recognizing the state of the load of the base station eNB2 at the current time point, thereby performing more appropriate communication control.

(2) Second Embodiment

In a mobile communication system according to a second embodiment, after receiving the load information 3 of the base stations eNB3 from the base stations eNB3, the base station eNB2 transmits the load information 2 of the base station eNB2 and the load information 3 of the base stations eNB3 to the base station eNB1. Furthermore, after receiving the load information 2 of the base station eNB2 and the load information 3 of the base stations eNB3 from the base station eNB2, the base station eNB1 weights the load information 2 of the base station eNB2 using the load information 3 of the base stations eNB3.

Hereinafter, the second embodiment will be described in the sequence of (2.1) Operation of mobile communication system and (2.2) Effect of the second embodiment. Differences from the first embodiment will be described and a description identical to that of the first embodiment will be omitted.

(2.1) Operation of Mobile Communication System

Figure 6:
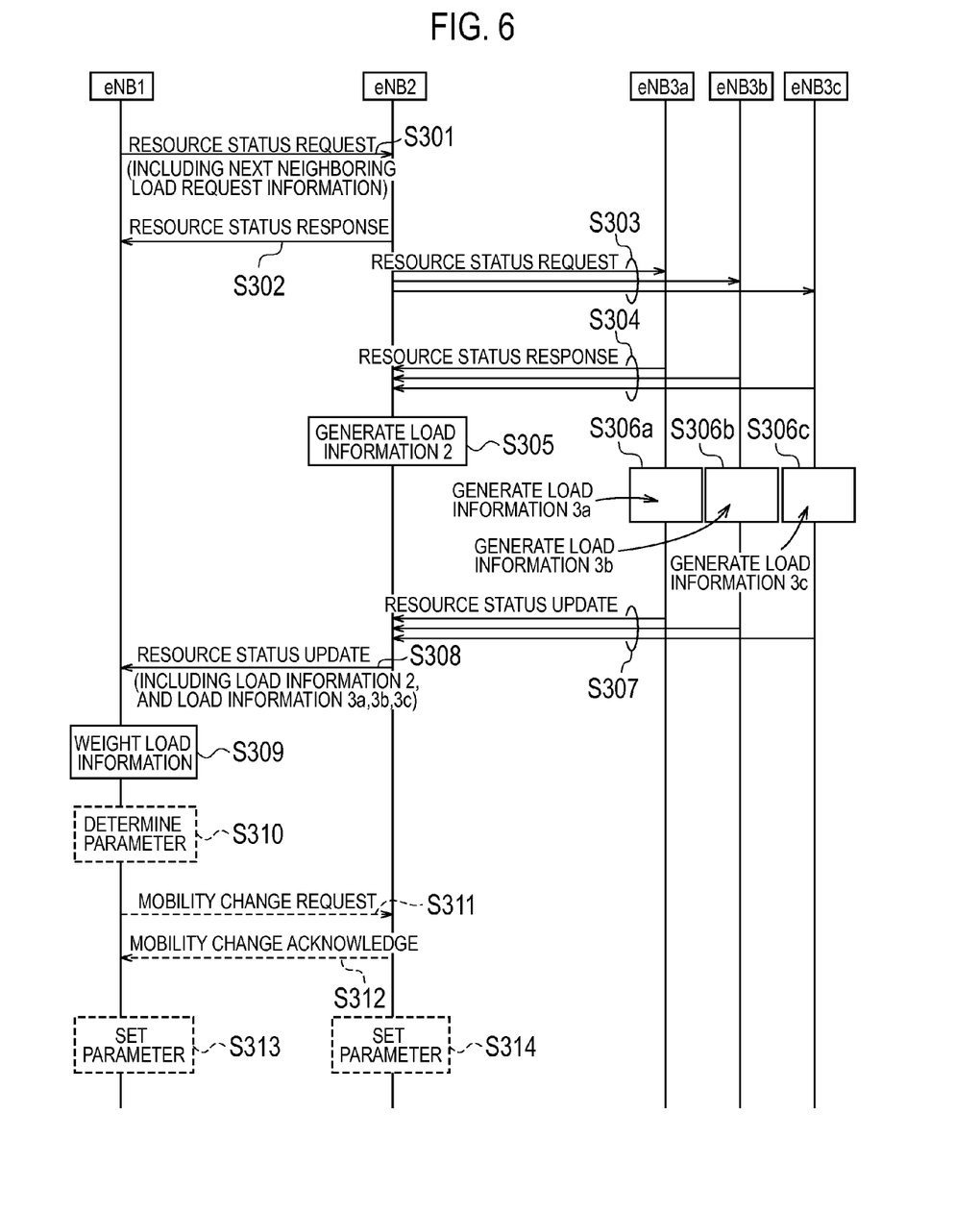
FIG. 6 is a sequence diagram illustrating the operation pattern 1 of the mobile communication system according to the second embodiment.

FIG. 6 is a sequence diagram illustrating the operation pattern 1 of the mobile communication system 1 according to the second embodiment. In addition, the operation pattern 2 is equal to that in the first embodiment.

In step S301, the base station eNB1 transmits, to the base station eNB2, a Resource Status Request message including information (next neighboring load request information) for requesting the load information 3 of the base station eNB3. The base station eNB2 receives the Resource Status Request message.

In step S302, the base station eNB2 transmits a Resource Status Response message to the base station eNB1 when permitting the Resource Status Request message from the base station eNB1. The base station eNB1 receives the Resource Status Response message.

In step S303, the base station eNB2 transmits the Resource Status Request message to the base stations eNB3 in response to the reception of the Resource Status Request message which designates the presence of the load information 3 of the base station eNB3, from the base station eNB1.

In step S304, the base stations eNB3 transmit a Resource Status Response message to the base station eNB2 when permitting the Resource Status Request message from the base station eNB2. The base station eNB2 receives the Resource Status Response message.

In step S305, the base station eNB2 measures a load of the self base station (the base station eNB2) according to the Resource Status Request message from the base station eNB1, and generates load information 2 indicating a measurement result. In addition, the process in step S305 may be performed before step S303 or between step S303 and step S304.

In step S306, the base stations eNB3 measure loads of their self base stations (the base stations eNB3) according to the Resource Status Request message from the base station eNB2, and generate load information 3 indicating a measurement result. Specifically, the base station eNB3a generates load information 3a, the base station eNB3b generates load information 3b, and the base station eNB3c generates load information 3c.

In step S307, the base stations eNB3 transmit a Resource Status Update message including the load information 3 to the base station eNB2. The base station eNB2 receives the Resource Status Update message.

In step S308, the base station eNB2 transmits, to the base station eNB1, a Resource Status Update message including the load information 3 received in step S307 and the load information 2 generated in step S305. The base station eNB1 receives the Resource Status Update message.

In step S309, the base station eNB1 weights the load information 2 included in the Resource Status Update message using the load information 3 included in the Resource Status Update message. As described above, the weighting indicates a process of adding a result, which is obtained by multiplying the load information 2 by a predetermined coefficient, to a result obtained by multiplying the load information 3 by a predetermined coefficient. Alternatively, the weighting may indicate a process of calculating an average of the load information 2 and the load information 3.

In step S310, the base station eNB1 determines a handover parameter between the self base station and the base station eNB2, by using the weighted load information 2. For example, when the load information 1 indicating that the load of the base station eNB1 is equal to the weighted load information 2, the base station eNB1 considers the handover parameter to be optimized, and maintains the handover parameter without a change. Meanwhile, when the load information 1 is lower than the weighted load information 2, the base station eNB1 adjusts the handover parameter to expand the coverage of the self base station. Furthermore, when the load information 1 is higher than the weighted load information 2, the base station eNB1 adjusts the handover parameter to reduce the coverage of the self base station with respect to the base station eNB2. When the base station eNB1 adjusts a handover parameter of the self base station, the following processes are performed.

In step S311, the base station eNB1 transmits a Mobility Change Request message including the adjusted handover parameter to the base station eNB2. The base station eNB2 receives the Mobility Change Request message.

In step S312, the base station eNB2 transmits a Mobility Change Acknowledge message to the base station eNB1 when permitting the Mobility Change Request message. The base station eNB1, the base station eNB2, receives the Mobility Change Acknowledge message.

In step S313 and step S314, the base station eNB1 and the base station eNB2 set the adjusted handover parameter therein.

In addition, the processes of steps S305 to S309 are repeated until the base station eNB1 requests the base station eNB2 to stop the transmission of the load information.

(2.2) Effect of the Second Embodiment

As described above, according to the second embodiment, after receiving the load information 3 of the base stations eNB3 from the base stations eNB3, the base station eNB2 transmits the Resource Status Update message including the load information 2 of the base station eNB2 and the load information 3 of the base stations eNB3, to the base station eNB1. After receiving the Resource Status Update message including the load information 2 of the base station eNB2 and the load information 3 of the base stations eNB3 from the base station eNB2, the base station eNB1 weights the load information 2 of the base station eNB2 using the load information 3 of the base stations eNB3. In this way, the base station eNB1 is able to perform communication control for the future in consideration of the state of the loads of the base stations eNB3, which are next neighboring base stations, that is, a potential load of the base station eNB2 which is a neighboring base station.

Furthermore, in the second embodiment, when the Resource Status Request message from the base station eNB1 designates the presence of the load information 3 of the base stations eNB3, the base station eNB2 transmits, to the base station eNB1, the load information 3 of the base stations eNB3 in addition to the load information 2 of the base station eNB2. Meanwhile, when the Resource Status Request message from the base station eNB1 designates the absence of the load information 3 of the base stations eNB3, the base station eNB2 transmits the load information 2 of the base station eNB2 to the base station eNB1. In this way, the base station eNB1 is able to cope with both a situation for recognizing the state of the load of the base station eNB2 including a potential load and a situation for recognizing the state of the load of the base station eNB2 at the current time point, thereby performing more appropriate communication control.

(3) Other Embodiments

As described above, the present invention has been described according to the embodiments. However, it must not be understood that the discussions and the drawings constituting a part of this disclosure limit the present invention. From this disclosure, various alternative embodiments, examples and operational techniques will be apparent to those skilled in the art.

In the aforementioned first embodiment, in response to the reception of the Resource Status Request message from the base station eNB1, the base station eNB2 transmits the Resource Status Request message to the base stations eNB3. However, in the case of transmitting the Resource Status Request message to the base stations eNB3 before receiving the Resource Status Request message from the base stations eNB1, it is not necessary for the base station eNB2 to transmit the Resource Status Request message to the base stations eNB3.

In the aforementioned each embodiment, the offset value was described as the handover parameter. However, as well as the offset value, a handover threshold value to be compared with RSRP may be adjusted. Furthermore, as well as the adjustment of the handover parameter, another base station parameter (for example, an antenna tilt angle or transmission power) may be adjusted, so that a coverage is physically expanded or reduced. Moreover, communication control based on load information may include another communication control as well as the expansion or reduction of the coverage.

As described above, it must be understood that the present invention includes various embodiments and the like which are not described herein.

Note that the entire content of the Japanese Patent Application No. 2010-257702 (filed on Nov. 18, 2010) is incorporated herein by reference.

INDUSTRIAL APPLICABILITY

As described above, a mobile communication system, a base station, and a communication method according to the present invention are useful in the radio communication, by which it is possible to sufficiently improve service quality by performing communication control in consideration of a load of a next neighboring base station in addition to a load of a neighboring base station.

The invention claimed is:
1. A mobile communication system capable of communication control on the basis of load information transmitted/received between base stations by using inter-base-station communication, comprising:
a first base station; a second base station adjacent to the first base station; and at least one third base station adjacent to the second base station, wherein after receiving load information of the third base station from the third base station, the second base station transmits, to the first base station, load information of the second base station weighted by using the load information of the third base station, when transmitting the load information of the second base station weighted using the load information of the third base station to the first base station, the second base station transmits, to the first base station, information indicating that the load information of the second base station has been weighted, and the first base station transmits to the second base station, a load transmission request designating weighting.

2. The mobile communication system according to claim 1, wherein the first base station transmits a transmission request of the load information of the second base station to the second base station, the second base station transmits a transmission request of the load information of the third base station to the third base station in response to reception of the transmission request from the first base station, and the third base station transmits the load information of the third base station to the second base station in response to reception of the transmission request from the second base station.

3. The mobile communication system according to claim 1, wherein the first base station transmits a transmission request designating weighting or no weighting, the second base station transmits, to the first base station, the load information of the second base station weighted by using the load information of the third base station, when the transmission request from the first base station designates weighting, and transmits, to the first base station, load information of the second base station not weighted by using the load information of the third base station, when the transmission request from the first base station designates no weighting.

4. A base station that operates as a second base station in a mobile communication system which includes a first base station, the second base station adjacent to the first base station, and at least one third base station adjacent to the second base station, and capable of communication control on the basis of load information transmitted/received between base stations, wherein after receiving load information of the third base station from the third base station, the base station transmits, to the first base station, load information of the base station weighted by using the load information of the third base station, when transmitting the load information of the base station weighted using the load information of the third base station to the first base station, the base station transmits, to the first base station, information indicating that the load information of the base station has been weighted, and the first base station transmits to the base station, a load transmission request designating weighting.

5. A communication method used in a mobile communication system which includes a first base station, a second base station adjacent to the first base station, and at least one third base station adjacent to the second base station and capable of communication control on the basis of load information transmitted/received between base stations, comprising:

transmitting to the first base station, by the second base station, load information of the second base station weighted by using load information of the third base station after receiving the load information of the third base station from the third base station, when transmitting the load information of the second base station weighted using the load information of the third base station to the first base station, transmitting to the first base station, by the second base station, information indicating that the load information of the second base station has been weighted, and transmitting to the second base station, by the first base station, a load transmission request designating weighting.

\* \* \* \* \*